United States Patent [19]

Hodges

[11] 3,974,847

[45] Aug. 17, 1976

[54] LIQUID ADDITIVE DISPENSER

[76] Inventor: Kenneth M. Hodges, 12331 Washington Blvd., Los Angeles, Calif. 90066

[22] Filed: Apr. 5, 1973

[21] Appl. No.: 348,005

Related U.S. Application Data

[63] Continuation-in-part of Ser. No. 169,275, Aug. 5, 1971, abandoned.

[52] U.S. Cl. ........................ 137/101.11; 137/564.5
[51] Int. Cl.² ........................................ G05D 11/02
[58] Field of Search ............ 137/564.5, 101.11, 268, 137/205.5; 138/42; 222/278, 189; 251/127

[56] References Cited
UNITED STATES PATENTS

| | | | |
|---|---|---|---|
| 2,618,510 | 11/1952 | Mills | 137/564.5 |
| 2,815,889 | 12/1957 | Stetz | 138/42 X |
| 2,021,862 | 2/1962 | Miller | 137/205.5 |
| 3,060,956 | 10/1962 | Menzie | 137/205.5 |
| 3,166,096 | 1/1965 | Lang | 137/564.5 |
| 3,187,769 | 6/1965 | McDowell et al. | 137/564.5 |
| 3,194,444 | 7/1965 | Hubert | 137/205.5 |
| 3,295,563 | 1/1967 | Laya et al. | 222/189 X |
| 3,315,844 | 4/1967 | Klasson et al. | 222/189 X |
| 3,556,141 | 1/1971 | Hind | 137/564.5 |
| 3,720,230 | 3/1973 | Miller et al. | 137/564.5 |

*Primary Examiner*—William R. Cline

[57] ABSTRACT

An apparatus for dispensing liquid additives wherein a solution of concentrate is displaced from a closed container thereof and discharged into a flow line of liquid moving under pressure, said displacement being effected by differential positive and negative upstream and downstream pressure ports in said flow line and controlled by means of a selected restrictor of porous material having a determinable density that functions according to said differential in pressure to fix the flow rate of displacement liquid, said concentrate being displaced and discharged thereby at a determinable rate through the negative pressure port.

2 Claims, 5 Drawing Figures

U.S. Patent  Aug. 17, 1976  3,974,847
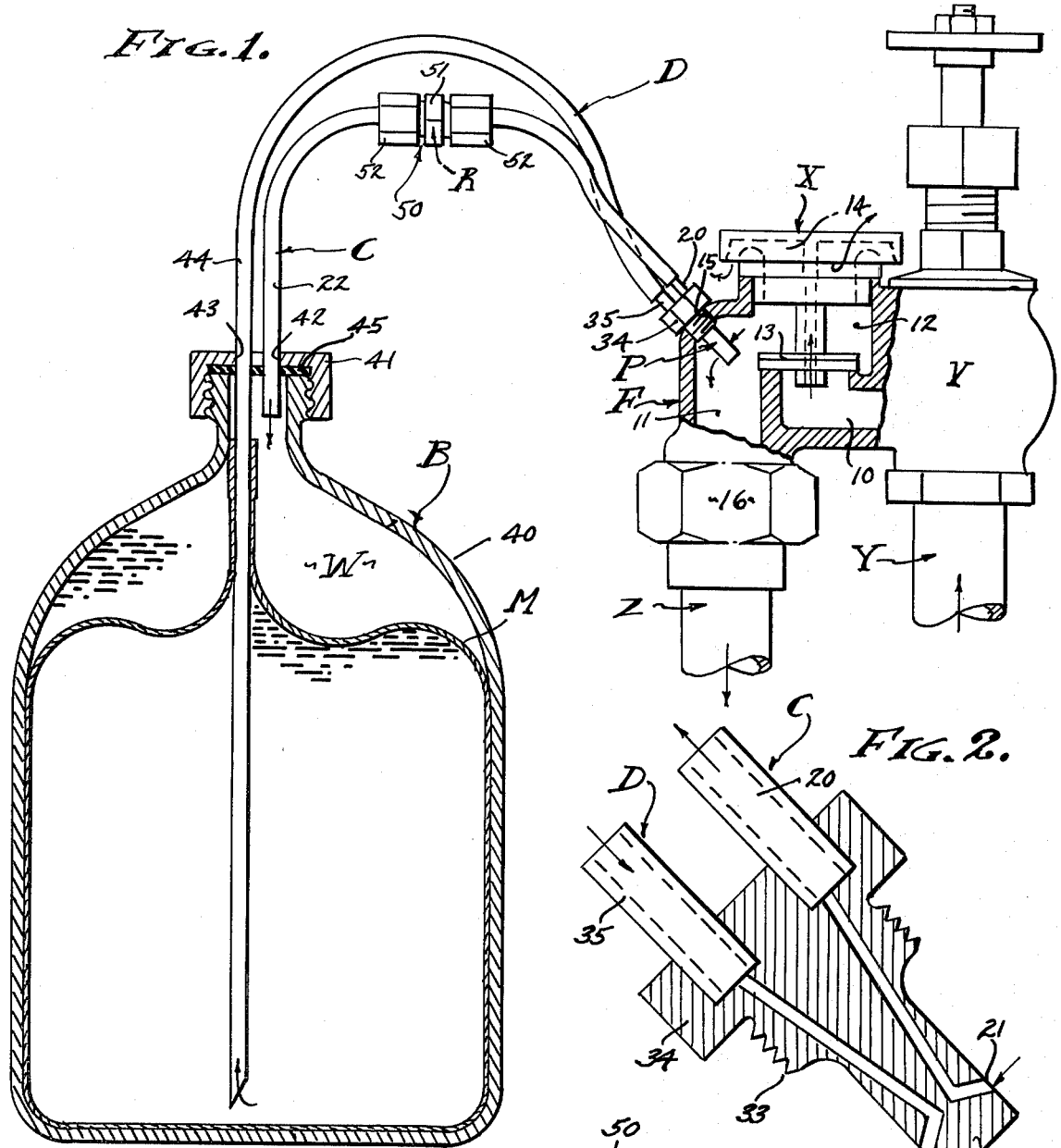

LIQUID ADDITIVE DISPENSER

This is a continuation-in-part of application Ser. No. 169,275, filed Aug. 5, 1971 and now abandoned.

BACKGROUND

Measured application of potent and/or concentrated liquids requires the addition thereof to liquid carriers in minute proportions, and to these ends liquid proportioners and the like are widely used and characterized by complexity and considerable expense. And with the prior art complexities, reliability and accuracy of such devices has been questionable especially, for example, in titrating a water line at relatively constant parts per million to be distributed as a fertilizer. In such a case, an overdosage can be extremely harmful and an underdosage rather useless. Furthermore, the water line pressures vary with different installations and all of which is upsetting to balance and accuracy, and all of which is difficult to cope with in usual systems. For instance, irrigation by use of sprinklers is widely used and is met with varied rates of flow and pressure; and it is under these circumstances that a liquid metering device must be made to operate with predetermined accuracy. To these ends therefore, I have provided a new and useful apparatus in the form of a liquid dispenser which is readily adapted to the flow and pressure factors which prevail, so as to be adjusted to dispense a relatively constant ratio of liquid additive into a liquid flow line.

FIELD OF INVENTION

The usual source of domestic water under pressure is from a faucet or hose bib, and of commercial water under pressure from a hydrant or pump; and in any case the rate of flow and pressure are relatively predeterminable constants. It is an object, therefore, to provide a relatively constant metering of additive into a flow line by means advantageously employing the substantially constant flow rate and substantially constant pressure involved in a given water supply installation, and all of which is determinable with facility in each instance.

The hydraulic distribution of liquid fertilizer is accepted practice, while certain requirements are imposed for the protection of water supply systems; for example, it is usually required that there be a "back flow preventer" between a water supply valve and a sprinkler system for lawns and the like. Therefore, and in the interest of protecting the water supply against contamination, the liquid additive dispenser herein disclosed is located downstream from the "back flow preventer", when the same is employed as may be required. And preferably, the adaption of this dispenser to such a water line is by means of a probe that is inserted permanently into the flow line to be exposed to the stream of water as it is transported therethrough to the multiplicity of sprinkler heads which characterize such a system. An object is, therefore, to provide a probe which includes therein all of the essential functions necessary to proportionately dispense liquid additive into the stream of water as it flows through said line.

Another object of this invention is to advantageously employ a pressure sensitive probe such as a Venturi or the like, in dispensing liquid additive at substantially constant parts per million, the ratio of additive to carrier being accurately determined by the precise establishment of a predetermined pressure differential between positive and negative pressure ports. With the present invention, a flow restrictor obstructs a pressure displacement connection which opens into the high upstream pressure of the flow line and which opens into a closed container of additive to displace the same in proportion to the rate of flow established by the said restrictor, the said pressure differential being duplicated at the probe or Venturi so as to accomplish the predetermined dispensery function.

It is still another object of this invention to provide a separation between the liquid additive and the carrier liquid which displaces the same in the container supply thereof, this separation being accomplished by several means. In cases where the two liquids are of different gravity and do not diffuse one into the other so as to comingle, it is a simple matter to float the lighter liquid upon the other; and to this end a fertilizer of organic nitrates is heavier than water, in which case the additive settles to the bottom of the container therefor and is siphoned from the bottom of said container. In the event that the additive is lighter than the carrier displacing the same, the additive floats upon the carrier and is siphoned from the top of the said container. In cases where the two liquids tend to comingle, a membrane of pliant material separates the two bodies of liquid, thereby compartmenting the container for liquid separation while permitting displacement of one liquid by the other.

It is also an object of this invention to provide an apparatus comprising the dispenser hereinabove referred to and which is readily adaptable to plumbing as it exists commercially. There are different materials employed in the fabrication of pipes, tubing, and valves and the like, and into which the probe of the present invention is applicable. To this end, therefore, the probe as hereinafter described is self-contained and is fastened into a valve body, or into a pipe, or into an adapter fitting as may be required with thin walled tubing or plastic pipe. Thus the pressure probe orientation and all pressure connections are simultaneously established, there being but two service line connections to the pressurized container supplying the additive.

|           |       | PRIOR ART:   |     |        |
|-----------|-------|--------------|-----|--------|
| 3,166,096 | 1–65  | Lang         | 222 | 386.5x |
| 3,342,377 | 9–67  | Peredy       | 222 | 95 x   |
| 3,315,844 | 4–67  | Klasson et al| 222 | 189 x  |
| 3,198,438 | 8–65  | Hultgren     | 239 | 365 x  |
| 3,295,563 | 1–67  | Laya et al   | 222 | 189 x  |

SUMMARY OF INVENTION

This invention relates to the proportionate dispensing of liquid additive into a liquid flow, it being a general object to add a determinable parts per million of one liquid to the other. The dispenser is embodied in an apparatus that is reduced to its simplist form for facility of manufacture, low cost, and for reliability accompanied by assured results. For example, a fertilizer comprised of organic nitrate is the additive to be metered into a flow line of water such as a sprinkler system water supply. This fertilizing additive is heavier than water and does not tend to diffuse therein, and consequently a separator need not be used. The essential features employed are, generally, a pressure differential probe P, an adapter A when required, and additive storgage and carrier accumulator B, a pressure connection C with a restrictor R, and a delivery connection D. The pressure probe P is oriented in the flow line F to be immersed in the carrier stream of water W which flows under pressure. The accumulator B can be remote and located or installed as desired while the connections C and D extend thereto from the pressure probe P. A feature of the invention is the incorporation in the pressure probe P of all line connections required, and which are thereby determinably related for assured operation of the dispenser.

DRAWINGS

The various objects and features of this invention will be fully understood from the following detailed description of the typical preferred forms and applications thereof, throughout which description reference is made to the accompanying drawings, in which:

FIG. 1 is an elevational view of the liquid additive dispenser as it would appear installed in a typical valve controlled anti-siphon check valve as used in supplying irrigation watering, and showing the removeable cap which characterizes the additive storage and carrier accumulator B of this invention.

FIG. 2 is an enlarged detailed sectional view of the Venturi or pressure probe P which characterizes this invention.

FIG. 3 is a perspective view of the restrictor R which characterizes the present invention.

FIG. 4 is an enlarged longitudinal sectional view of the coupling installation of the restrictor R; and FIG. 5 is a modified installation of the pressure probe P.

PREFERRED EMBODIMENT

In the drawings I have shown a back flow preventer X as it is used to protect a water main Y against contamination from a sprinkler system (not shown) or the like. The said sprinkler system is fed through a pipe Z under control of a valve V, the back flow preventer X being installed downstream from the valve V, and comprising spaced, parallel and vertically disposed inlet and outlet sections 10 and 11 joined at their upper ends by a horizontally disposed vent or check valve section 12. It is to be understood that "back flow preventers" are of various types, a check valve type being shown herein. A pressure and flow controlled valve 13 is reciprocably carried by section 12 to seat therein when there is a stoppage of or a back flow of liquid within the flow passage extending through the sections 10, 11 and 12. When the flow line is relieved of fluid pressure, the valve 13 drops by means of gravity and thereby opens a port 14 exposes the flow passage to atmospheric pressure. It is the downstream portion of this passage which is employed to receive the Venturi or pressure probe P for introducing additive into pipe Z which feeds the sprinkler system.

In accordance with this invention, I provide the pressure probe P and which I prefer to insert into the body of the back flow preventer X immediately downstream from the controlling valve V. This placement of the pressure probe P is significant and assures freedom from contamination of the water main which supplies the valve V. Furthermore, this placement of the pressure probe P is convenient and practical, it being a simple matter to drill a press fit and/or tap a threaded opening 15 into the body of the back flow preventer ahead of the coupling 16 where it discharges into the pipe Z. In practice, the threaded opening 15 is disposed on an axis projecting through the center of the flow passage, for example, at the corner of the body where sections 10 and 12 are joined at right angles, preferably at a 45° angle bisecting the angle of joinder.

The pressure probe P enters the flow passage of the liquid carrier to tap the upstream line pressure and downstream line pressure therein and to thereby establish a fixed differential in pressure under operating conditions. The positive pressure tap 20 for high pressure involves a port 21 that is disposed to face upstream, while the negative pressure tap 35 for low pressure involves a port 31 that is disposed to face downstream. The ports 21 and 31 are advantageously formed in a stem 32 substantially smaller in diameter than the flow passage and which projects inwardly from a plug 33 threadedly engaged into the opening 15. The positive pressure tap 20 can be said to sense ram pressure while the negative pressure tap 35 can be said to sense siphon or suction pressure. There is a pressure displacement connection tube 22 in communication with port 21 to join to the tap 20, and there is a liquid delivery connection tube 44 in communication with port 31 to join to the tap 35. Thus, the pressure probe P senses both ram and suction pressure within the flow pipe Z, to be applied as positive and negative pressures in order to displace liquid from the accumulator B.

The adapter A is employed as shown in FIG. 5 to accommodate the Venturi or pressure probe P when it is to be inserted into a plastic pipe or tubing, or the like, in which case a saddle 25 is secured to the pipe and drilled and tapped at 26 to threadedly receive the plug 33, the same as above described. The saddle is applied to a straight section of pipe, in which case the stem axis of the Venturi or pressure probe is normal to the central axis of said pipe.

The additive storage and carrier accumulator B is a closed vessel 40 that stores additive or concentrated liquid and receives carrier liquid under pressure to displace the same. In practice, the additive storage and carrier accumulator B is initially filled with the additive liquid and is then closed to atmosphere by a removable cap 41 threaded onto or otherwise secured over the top opening of the vessel 40. The cap 41 has openings 42 and 43 to pass the tubes 22 and 44 to enter the accumulator B, the tube 22 to impress the positive upstream pressure to the interior of the vessel 40 and the tube 44 to receive additive liquid displaced by the entry therein of carrier liquid. The openings 42 and 43 are established by means of spaced parallel bores entering through the cap 41 to freely pass the tubes 22 and 44 respectively, and sealed by a compressible gasket 45 of elastomer fitted tightly over said tubes to constrict thereon the siphon tube 44 that extends through the opening 43 and projects to the bottom of said vessel. The tube 44 is imperforate with a truncated end that will not obstruct liquid flow when touching the vessel bottom. The tube 22 opens into the annulus around tube 44 within the upper portion of the accumulator B.

In accordance with this invention, the restrictor R is provided to establish the required metering imbalance to be reflected at the pressure probe P. That is, there is an imbalance within the system wherein the ram pressure at the upstream side of the restrictor R is greater than the suction pressure at the downstream side of the restrictor R. Thus, the restrictor R is provided to meter the flow through the positive pressure port 21 and into the vessel 40 surrounding the siphon tube 44. The restrictor R can be placed at any desired point in the circuit; however, it is preferred that it be installed in the pressure displacement connection tubes 22, later to be described.

In carrying out this invention, the restrictor R is unique, being a body of porous material as distinguished from the usual valves or orifices that characterize prior art devices. To this end, the restrictor R is exposed to the entire diameter of the flow passage 42 and is exposed to the full flow of clean upstream liquid under pressure. The large area of restriction is not vulnerable to clogging and is long lived while acting as a filter that is gradually saturated with foreign matter. In practice, a sintered metal cylinder is compressed to the required and measurably controlled density, and serves as the metering means of this dispenser.

The connections C and D are made of plastic tubing, or the like, the pressure displacement connection tube 22 extending flexibly from the differential probe P with a coupling 50 capturing the restrictor R in working position, and the liquid pressure delivery connection 44 extending flexibly from the differential probe and continuing into the vessel 40 as the siphon tube 44. The coupling 50 is a tubing union adapted to join continuing sections of the tube 44, and it comprises a cylinder body 51 with opposite nuts 52 threaded onto the body and with clamp means 53 to engageably anchor the tube sections thereto. As shown, the opposed terminal ends 54 of the tube sections are spaced for the reception of the restrictor R therebetween. The flow passages 42 of the tube sections open at the opposite normal ends of the restrictor which is of right cylinder form slideably installed in a complementary bore 55 through the coupling body 51. Thus, the liquid under pressure in tube 44 will restrictively pass through the sintered metal of controlled density.

From the foregoing, the construction and operation of this liquid additive dispenser will be clear; that I have provided positive pressure displacement within the storage and carrier accumulator B and that I have applied this positive differential in pressure at the orifice 31 of the pressure probe P. There is a determinably constant pressure differential between the upstream high pressure port 21 and the downstream low pressure port 31, dependent upon the rate of flow; and though the rate of flow is not critical, it is a simple matter to, for example, determine said pressure differential for a given valve setting of a sprinkler system. Therefore, the operational differential in pressure is determined and from which factor the required restrictor R is selected dependent upon the mixture proportions required, the rate of liquid flow through the restrictor R being dependent upon the prevailing pressure differential. Alternately, the rate of flow into the sprinkler system can be used as a base factor for selection of the required restrictor R, since pressure differential is a direct function thereof. Accordingly, the restrictor R is selected for its porosity and inherent capability of fixing the flow of liquid when at a substantially constant differential pressure at opposite upstream and downstream sides thereof.

In the event that diffusable liquids are being handled, or an additive lighter than the carrier liquid, the two are separated by the membrane M, as illustrated in FIG. 1, which is an imperforate bag of flexible material that is sealed over and into which the siphon tubes 44 project. As the vessel fills with carrier fluid the membrane M collapses around the siphon tube 44 thereby forcing the additive to discharge at the orifice 31.

It will be observed that the restrictor R is readily replaced and that the apparatus as such is versitile in its adaptability to most any water distribution system wherein the dispensing of an additive is required. The apparatus is automatically made operative when flow occurs through the pressure probe P, and when said flow ceases there is a corresponding cessation of operation. Auto-siphoning of the additive out of the accumulator B is prevented by installing the same with its uppermost liquid level below the negative pressure discharge orifice 31 in the Venturi, and also by venting the apparatus through the back flow preventer X as hereinabove described; and consequently there is no danger of losing additive when the system is deactivated.

Having described only a typical preferred form and application of my invention, I do not wish to be limited or restricted to the specific details herein set forth, but wish to reserve to myself any modifications or variations that may appear to those skilled in the art

I claim:

1. A liquid proportioning dispenser for precisely fixing the flow rate of an additive charged liquid of variable viscosity into the flow line of a carrier liquid having substantially uniform viscosity and including; a closed vessel storing the first mentioned liquid, a positive pressure port exposed into a high upstream pressure of the first mentioned flow line, a negative pressure port exposed into a low downstream pressure of the first mentioned flow line, a tubular liquid pressure displacement connection from the positive pressure port and into the closed vessel, and a tubular liquid pressure delivery connection into the negative pressure port and opening from the additive charged liquid stored in the closed vessel, there being a flow restrictor in the form of a pourous body pressed into the body of a coupling joining sections of the tubular liquid pressure displacement connection which oppose and position the said porous body plugging the said positive pressure port and connection therefrom into said closed vessel, whereby the differential between upstream and downstream pressures determines the flow rate of upstream carrier liquid of substantially uniform viscosity through said flow restrictor and displaces stored additive charged liquid to be subsequently dispensed into the downstream liquid at a substantially uniform slow flow rate.

2. The liquid proportioning dispenser as set forth in claim 1, wherein the porous body of the flow restrictor is sintered metal compressed to a measurably controlled density for a determined flow rate of fixed viscosity liquid therethrough.

* * * * *